UNITED STATES PATENT OFFICE.

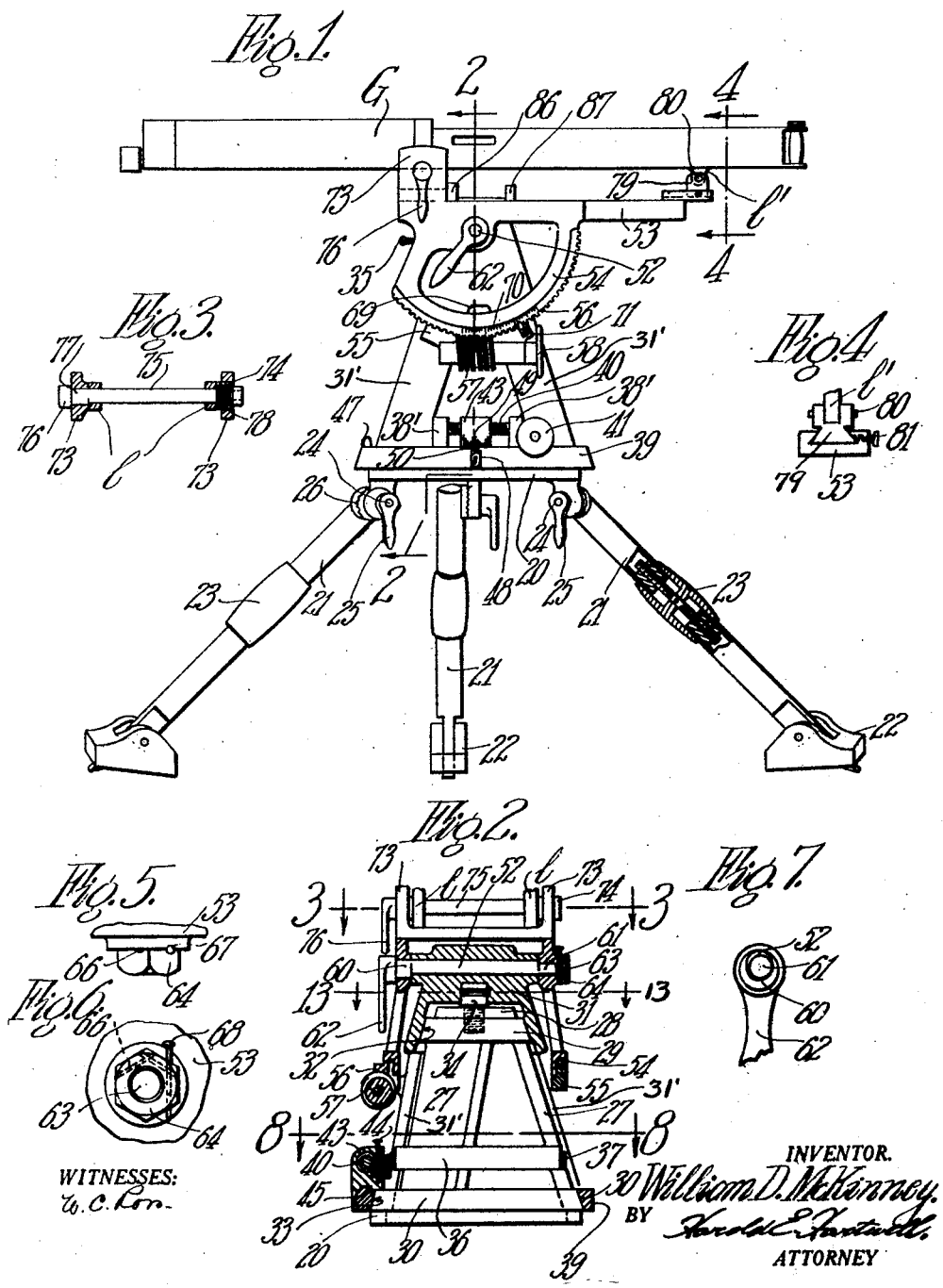

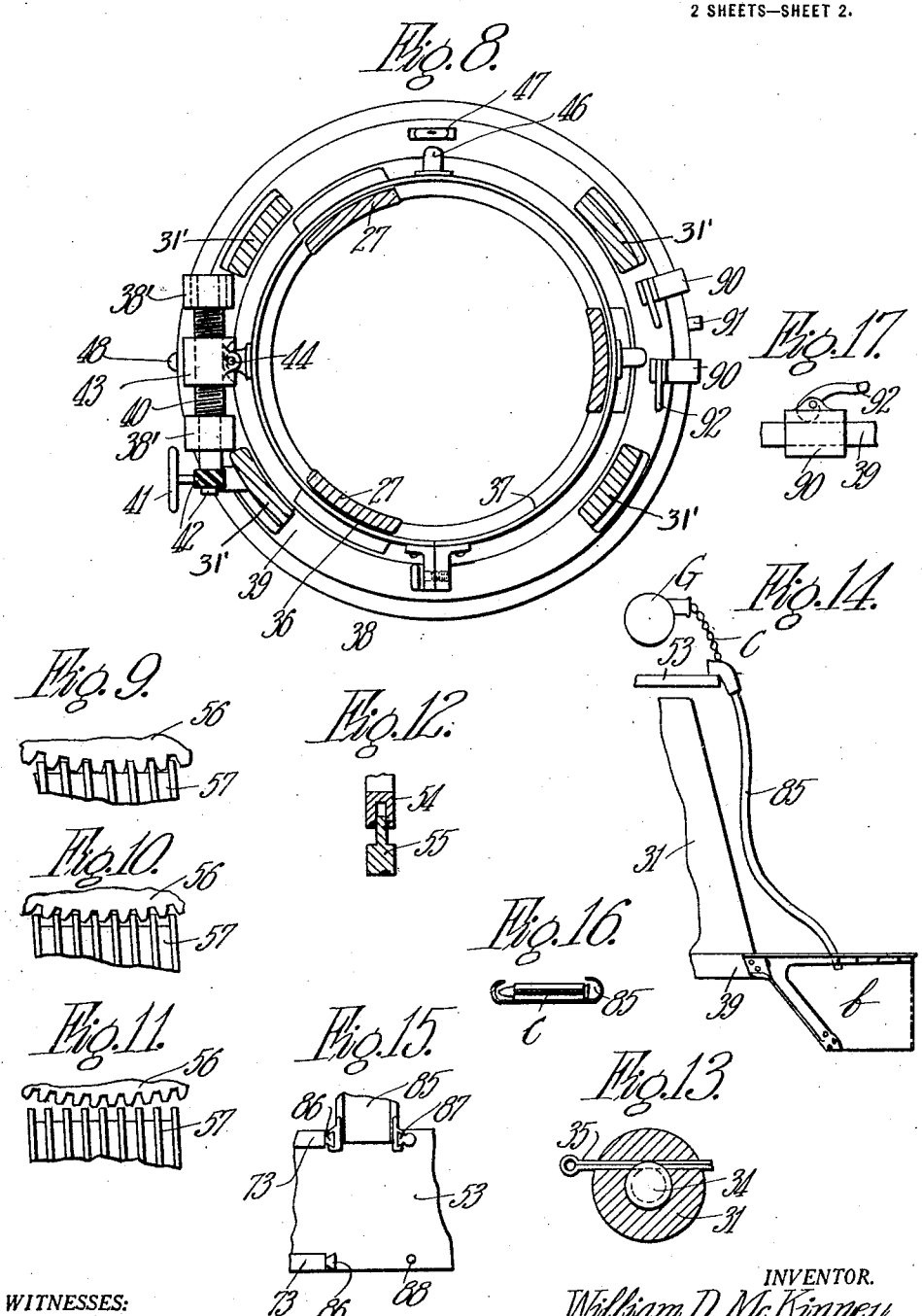

WILLIAM DONALD McKINNEY, OF LOS ANGELES, CALIFORNIA, ASSIGNOR OF FORTY-FIVE ONE-HUNDREDTHS TO FOREST R. GEE AND FIFTY-FIVE ONE-HUNDREDTHS TO JAMES T. ROBINSON, BOTH OF HOLYOKE, MASSACHUSETTS.

GUN-MOUNT.

1,324,604.     Specification of Letters Patent.     Patented Dec. 9, 1919.

Application filed March 9, 1918. Serial No. 221,488.

*To all whom it may concern:*

Be it known that I, WILLIAM DONALD MCKINNEY, a citizen of the United States of America, and residing at Los Angeles, in the county of Los Angeles and State of California, but temporarily residing at Holyoke, in the county of Hampden and State of Massachusetts, have invented certain new and useful Improvements in Gun-Mounts, of which the following is a specification.

This invention relates to gun mounts, and particularly to gun mounts which are adapted to support relatively small arms, such as machine guns and the like, for example.

The broad object of the invention is to provide a mounting for a machine gun or the like, which embodies gun training and elevating mechanism of such a type that the gun may be swung to any position in a horizontal plane, or elevated through a wide angle, or both, with substantially as close accuracy as the telescope of an engineer's transit, and which is so constructed as to afford a sturdy, rigid, and stable support for the gun by means including, in part, locking and clamping devices to firmly hold all adjustable parts of the mount while the gun is firing.

Another object of the invention is to provide in a gun mount a gun-carrying saddle which is mounted for swinging movement relatively to a suitable support and is so mounted on the latter as to afford at all times a three-point support for the saddle.

Another object is to provide in a gun mount, a saddle of the class described which, although adjustable relatively to its support, may be rigidly clamped thereto and held against displacement in all directions relatively to its support.

A further object of the invention is to provide in a gun mount, in combination with a saddle of the class described, means whereby the gun may be mounted on the saddle for ready and convenient removal and yet may be clamped rigidly thereto so that the gun and saddle cannot move the one relatively to the other in any direction.

Other objects and advantages will appear in the following description and will be particularly pointed out in the appended claims.

The invention, in an embodiment at present preferred, is shown for illustrative purposes in the accompanying drawings, in which:

Figure 1 is an elevational view of a gun mount embodying the invention;

Fig. 2 is a sectional elevational view thereof, taken on the line 2—2 of Fig. 1;

Fig. 3 is a fragmentary sectional plan view taken on the line 3—3 of Fig. 2;

Fig. 4 is a fragmentary elevational view taken on the line 4—4 of Fig. 1;

Figs. 5 and 6 are enlarged plan and elevational views of the locking nut shown in Fig. 2;

Fig. 7 is an end elevational view of the saddle locking device;

Fig. 8 is an enlarged sectional plan view taken on the line 8—8 of Fig. 2;

Figs. 9, 10, and 11 are enlarged fragmentary views of the worm and segment for operating the saddle and illustrate various relative positions of these parts;

Fig. 12 is a fragmentary cross-sectional view of the saddle-guides and the trackways upon which they ride;

Fig. 13 is a fragmentary sectional plan view taken on the line 13—13 of Fig. 2, showing a different relative positioning of a sector relatively to its trackway;

Figs. 14 and 15 are elevational and plan views, respectively, of the flexible member for guiding the cartridge belt from the cartridge box to the gun;

Fig. 16 is a cross-sectional view of the flexible guiding member; and

Fig. 17 is a fragmentary elevational view, illustrative of the adjustable stop devices for limiting the degree of movement of the training mechanism.

Referring to these drawings in detail: 20 represents a suitable base member, preferably ring-shaped as shown, and pivoted thereto at angularly-spaced points are a plurality of tripod legs 21, which are provided at their lower ends with suitable ground-engaging shoes 22. Preferably, each leg 21 is made in two sections, as shown in Fig. 1, which sections are connected by a turn-buckle 23 in such a manner that the legs may be shortened or elongated by regulable increments to facilitate accurate leveling of the ring member 20, in an obvious manner. Each leg has fixed thereto a laterally-projecting stud 24 which passes through a suitable depending lug on ring member 20 to form the pivotal connection above described. Handle nuts 25, threaded onto the ends of studs 24, serve to clamp the tripod legs 21 to the lugs on member 20, and by serrating the contacting faces of the legs and lugs, as at 26, it will be seen that the former may be rigidly clamped and locked in their adjusted positions to firmly hold the ring member 20.

Integral with and arranged in concentrical relation above the latter is a frusto conical trackway 30 and above the trackway is a cylindrical bearing surface 36. Integral with the latter and extending upwardly therefrom in converging relation are a plurality of webs 27, which support a top portion 28 having a frusto conical trackway 29. The members 27, 28, 29, and 30 constitute, in their entirety, a substantially frusto-conical support for other parts of the gun mount to be described. Obviously, such support may be made in truly frusto-conical shape, if desired, but for economy of material and lightness, without sacrifice to sturdiness and rigidity, it is preferred to construct the frusto-conical support in the manner illustrated. Telescoped over the described frusto-conical support is a hollow substantially frusto-conical member 31, which has upper and lower bearing surfaces 32 and 33 to ride on the corresponding surfaces 29 and 30, respectively, of the frusto-conical support and which is adapted for rotation about the latter as a vertical axis. The upper and lower parts of member 31 are connected by a series, as four, of upwardly extending webs 31', as shown in Figs. 1 and 8. A centrally-arranged king-pin 34, mounted for vertical adjustment in the portion 28 by reason of the screw-thread connection shown, is arranged to enter the outer frusto-conical member 31 and provides a means, whereby the latter may be raised and lowered by regulable increments to adjust the engagement of the coöperating bearing surfaces 29 and 32, and 30 and 33, or to compensate for wear of such surfaces. The outer frusto-conical member 31 is locked to the inner frusto-conical member by a pin 35, which, as shown in Fig. 13, passes through member 31 and engages in a suitable circumferential groove in the king-pin 34. It will thus be seen that the outer and inner frusto-conical members are firmly held together in such a manner that relative displacement axially in either direction is effectually prevented.

Means are provided whereby the member 31 may likewise be effectually held against rotation on the inner frusto-conical support. Referring to Fig. 2, it will be seen that a split brake-band 37 encompasses the described bearing surface 36, as best shown in Fig. 8, and may be clamped thereto by circumferentially contracting the band, as by the hand-screw 38 which passes loosely through a lug on one end of the band 37 and has a threaded engagement with a lug on the other end of the band. Rotatably mounted in and held against axial displacement relatively to a pair of spaced upstanding lugs 38' on the base-ring 39 of member 31 is a worm 40 which may be turned by a hand-wheel 41 through the intermediary of intermeshing spiral gears 42. Intermediate the lugs 38' and engaged with worm 40 is a nut 43 which is connected to the described band 37 by a vertical pivot-pin 44. Obviously, when band 37 is clamped to the surface 36 of the inner frusto-conical member, the nut 43 is substantially stationary, and the worm 40, as it is turned, moves axially relatively to the nut 43 and by its described engagement with lugs 38' moves the outer frusto-conical member 31. Necessarily, since the worm 40 swings with the latter, the nut 43 must also swing, and for this reason the pivot 44 has been provided rather than a rigid connection with band 37.

It will be obvious, also, that the turning of the member 31 relatively to band 37 causes the worm 40 to swing or oscillate nut 43 by lateral engagement with the nut. Such engagement might tend to make the nut and worm bind slightly and interfere with free turning of the worm. To prevent such binding action, the rim 39 is provided with an upstanding tongue 45 (Fig. 2) which extends between lugs 38' in parallel relation with the worm 40. The nut 43 is suitably grooved to engage tongue 45, and thus the tongue constitutes the means for oscillating nut 43 rather than worm 40.

It should be particularly noted that the inner and outer frusto-conical members, although capable of being rigidly clamped against axial displacement in either direction and against rotation, are also capable of quick detachment to permit convenient dismounting. Thus, pin 35 may be readily withdrawn to permit the member 31 to be lifted free from the inner frusto-conical support, and an appropriate movement of handle 38 will quickly release the band 37 from engagement with the said support. It is, however, not desirable to disconnect the nut 43 from band 37 to permit the removal of member 31 so a plurality of lugs 46 are provided on band 37, which lugs, as shown in Fig. 8, project radially outwardly and overlie the base-ring 39 of member 31. Consequently, when pin 35 is withdrawn and band 37 is released, the member 31 may be freely lifted from the inner frusto-conical support, and, in thus lifting member 31, its ring member 39 will engage and lift lugs 46 and thus lift the band 37.

The base-ring 39 of member 31 is provided with the usual horizontal and vertical levels 47 and 48 so that the ring may be accurately adjusted, by appropriate movements of the described turnbuckles 23, to lie in a horizontal plane. The hand-screw 38 constitutes a quick-acting means to release the member 31 for free rotation in a horizontal plane. Thus, member 31 may be rapidly swung approximately into the desired position, and after band 37 has been tightened, the small and regulable increments of angular movement necessary to swing member 31 accurately into the desired position may be obtained by turning the hand wheel 41. A suitable scale 49 is provided on the outer face of nut 43 to register with a graduation 50 on ring 39, whereby the member 31 may be swung by known and measured increments. The apparatus is so constructed that the scale 49 may advantageously be the so-called "mil scale" well known in military circles.

Means are also provided to limit the degree of relative angular movement between the inner and outer frusto-conical members, for the purpose of training the gun through a given angle of movement. Thus, on the base ring 39 of member 31 are two stops 90 which are adjustably held thereto by an eccentric clamping lever 92. On the base ring 20 of the inner frusto conical member is a fixed stop 91, which is adapted to lie between the two stops 90. The latter may be set accurately to the two angular positions desired and quickly clamped. Thereafter, when hand-screw 38 is released the member 31 may be quickly swung to and fro between the limits defined by the stops 90.

Carried by the described member 31 and mounted to swing in a vertical plane about an axis 52 is a gun-carrying saddle 53. The latter has two spaced sector-shaped depending portions 54 which, as clearly shown in Fig. 2, are arranged to straddle the outer frusto-conical member 31. Suitably fixed to the latter and each spanning a pair of webs 31' are two spaced arcuate tracks 55 upon which the sectors 54 are arranged to ride. As shown in Fig. 2, the sectors 54 and tracks 55 have a tongue-and-groove engagement, which effectually prevents lateral displacement of the saddle 53 relatively to member 31. Fixed to one of the sectors 54 is a segmental gear 56, which is engaged by a worm 57 rotatably mounted on the member 31 and suitably held against axial displacement relatively thereto. A hand wheel 58 permits convenient actuation of worm 57 to turn the segment gear 56 and thus the saddle 53 about its axis 52.

Means are provided whereby the saddle 53 may be rigidly clamped to the member 31. The described pivot 52 is provided with two integral and axially-spaced eccentrics 60 and 61 (see Fig. 2) which engage in the spaced depending portions of saddle 53. These eccentrics are made of equal throw, although preferably, they are made of different diameter to permit the entire assembly (the shaft 52 and eccentrics 60) to be withdrawn axially (to the left as viewed in Fig. 2) as a unit. A handle 62 is provided as a convenient means for actuating the eccentrics. The eccentric 61 is extended beyond the saddle 53 and is threaded, as at 63, to receive a nut 64. The latter constitutes a means for retaining the shaft 52, and its eccentrics, in position, and also has an important locking function. The nut 64 is originally turned up on the threaded portion 63 as tightly as possible without interfering with free swinging movement of the saddle relatively to member 31. Necessarily, there must exist some clearance between the inner side walls of the saddle and the outer faces of the member 31, in order to permit free swinging of the saddle. However, it is particularly desired that such clearance should not exist when the saddle 53 is locked to member 31. Accordingly, the nut is provided with a plurality of grooves 66 in its inner end face, and on the adjacent face of the saddle is a groove 67. Both grooves 66 and 67 are semi-circular in cross-section, and when one of the former is brought into parallel relation with the latter, a pin 68 may be passed through the hole formed by the two alined grooves. Thus, nut 64 may be effectually locked against rotation, although it is readily adjustable from time to time or conveniently dismountable, when desired.

As illustrated, the handle 62 and eccentrics 60 and 61 are so positioned that the sectors 54 are forced tightly against their trackways 55. Similarly, the segment gear 56 is depressed into the worm 57, as clearly shown in Fig. 9, to take up all backlash. Likewise, the threaded portion 63 has been turned into nut 64 sufficiently to firmly force the side walls of the saddle 53 against the adjacent surfaces of member 31. Thus, the saddle is rigidly clamped against even the slightest degrees of lateral, vertical, or rotative displacement. The saddle is held to the member 31 between the hub of handle 62 and nut 64 to prevent lateral displacement in either direction, and such displacement is also prevented, by the described tongue-and-groove engagement between the sectors 54 and tracks 55. The saddle 53 is held between the spaced eccentrics 60 and 61 and the spaced tracks 55 to prevent vertical displacement in either direction. Similarly, rotative displacement is effectually prevented by the engagement of the gear 56 and worm 57, the teeth of which have been forced into intimate and binding engagement.

By turning handle 62 slightly to the right, as viewed in Fig. 1, the eccentrics 60 and 61 may be moved to slightly raise the gear 56 relatively to worm 57, and the condition illustrated in Fig. 10 then obtains. Likewise, such movement of handle 62 will turn the threaded portion 63 sufficiently to release the lateral binding engagement theretofore existing between the saddle 53 and member 31. The hand wheel 58 may then be freely turned to cause swinging movements of the saddle. Obviously, the latter may be moved but slowly by hand wheel 58 and by small closely regulable increments, such as are desirable for close accuracy in setting the saddle, and the gun carried thereby, to the desired angle. For rapid setting of the saddle 53, approximately to the desired angle, the handle 62 may be moved still farther to the right so that the eccentrics 60 and 61 lift gear 56 entirely free from worm 57, as shown in Fig. 11. Preferably, however, the sectors 54 are so arranged as to still engage the tongues of tracks 55, as shown in Fig. 12, even when gear 56 has been lifted free from its worm 57.

One of the sectors 54 is provided with a level 69, whereby the saddle 53, and particularly the gun carried thereby, may be positioned in a horizontal plane. The segment gear 56 may be provided with a suitable scale 70, such as the "mil scale", for example, and indications of the scale may be read by reference with a pointer 71 on one of the trackways 55.

The saddle 53 is arranged to receive any of the standard makes of machine guns. A conventional representation of a machine gun is indicated by reference letter G. Intermediate the ends of gun G are two laterally-spaced depending lugs $l$ (Figs. 2 and 3) which loosely fit between two spaced upstanding lugs 73 on saddle 53. A bushing 74 threaded into one lug 73, is adapted to be manually turned so that its inner end will engage the outer face of one lug $l$ and force it and the gun to the left (Fig. 3) until the other lug $l$ bears against the other lug 73. Thus, side play of the gun relatively to the saddle is prevented. A locking pin 75, having an actuating hande 76, is passed horizontally through the lugs $l$ and 74. Formed integrally with pin 75 are two eccentrics 77 and 78 similar to the described eccentrics 60 and 61. Eccentric 77 engages in the left-hand lug 73 (Fig. 3) and eccentric 78 in bushing 74. By turning handle 76 into the position illustrated in Fig. 1, the lugs $l$ of gun G are firmly forced against the top face of saddle 53.

The saddle 53 extends to the right, as viewed in Fig. 1, to support the rear end of gun G by engagement with a lug $l'$ thereon. Since in various makes of guns the distance between lugs $l$ and $l'$ varies slightly, provision must be made to compensate for this variation if the gun mount is to be capable of accommodating any standard make of gun, as is desired. To this end, the saddle 53 is dovetailed to receive a slidable block 79 (Fig. 4) and the lug $l'$ of the gun is connected to block 79 by a suitable pin 80. The block 79 may be clamped to the saddle by suitable means, as by a set screw 81 (Fig. 4). It is to be noted that, as handle 76 is turned to force the lugs $l$ against the saddle 53, as already described, the saddle is likewise moved forwardly slightly so as to take up any play in the connection between lug $l'$ and block 79. That is, the eccentrics 77 and 78, together with rod 75, connect the gun and lugs 73 together something in the fashion that a crank shaft would, only on a much smaller scale. Consequently, on turning handle 76, the gun is forced to travel in a curved path and this path may, of course, be resolved into two components, one longitudinally of the saddle or horizontally outward and one vertically downward. The former component acts to draw the gun forwardly on the saddle while the latter acts to force the lugs $l'$ against the top face of the saddle, as already described. Thus, gun G may be rigidly clamped to the saddle and effectually held against vertical, longitudinal, and lateral displacement thereon.

It is particularly desired not to adversely affect the stability of gun G by carrying the cartridge belt box on the gun or on the saddle 53. Accordingly the cartridge belt box, represented conventionally by reference letter $b$ in Fig. 14, is secured to the base ring 39 of the member 31. Since the saddle 53 may occupy various angular positions relatively to member 31, and since such angular movements of the saddle relatively to the box $b$ might interfere with proper feeding of the cartridge belt $c$ into gun G, a flexible trackway 85 is provided to connect the box $b$ and saddle 53, whereby belt $c$ may be guided accurately into gun G notwithstanding the twisting and turning of the belt which may occur between box $b$ and the saddle. As shown in Fig. 16, the cross sectional shape of trackway 85 is such as to hold the cartridge belt $c$ against both outward and lateral displacement relatively thereto.

It is desirable, however, to permit quick detachment of the trackway 85 and to permit this result the upper end of the latter has on either side a suitable recess to slip over two spaced dovetail-shaped lugs 86 and 87 on the saddle. The lugs 86 may conveniently be made integrally with the described upstanding lugs 73, and, since it may be desired to have the belt $c$ enter the gun from either side, a lug 86 is formed on each of the lugs 73. The lug 87, however, is arranged to slip into a hole 88 in the saddle 53, and, when it is desired to attach the trackway 85 to the opposite side of saddle 53 from that shown in Fig. 15, the lug 87 is simply removed and placed in that hole 88, shown as unoccupied in Fig. 15. It is to be understood that trackway 85 may be made in any suitable manner to afford the desired rigidity for guiding the belt c and yet to also permit the necessary flexibility. For example, it may be constructed in a manner generally analogous to the well-known flexible hose armor or in any other of the desirable ways now well known in the art.

The operation of the gun mount will be obvious from the foregoing description, but there are certain features of the gun mount which are important in operation, as will now be described. It is to be particularly noted that all the relatively movable parts of the gun mount may be firmly clamped and held against movement in any direction so that, after adjustment and clamping and during gun fire, such parts may be held together with substantially the same rigidity as if they were all made in one piece. Such rigidity of the parts is obviously desirable and important as insuring rigidity and stability of the gun and permits steadiness of aim and accuracy in firing. The detailed manner in which the above results are obtained has been fully pointed out heretofore.

Another important feature consists in the arrangement whereby the gun carrying saddle is held to the outer frusto conical member with a three point support, comprising the shaft 52 and the two spaced trackways 54. By such an arrangement, the saddle is firmly held to its supporting member and effectively braced therefrom to resist displacement in any direction. Particularly when the saddle is clamped to the outer frusto-conical member, as described, it is effectively held at three points against even such small increments of movement as are usually afforded by the clearances which are necessarily provided between moving parts to allow free movement. All such clearances are here provided as ordinarily, but the present gun mount is characterized by the provision of means to take up such clearances after they are no longer necessary for their usual function and at such times as they may be detrimental as permitting vibration and slight displacements to adversely affect the accurate pointing of the gun.

Another advantageous feature of the gun mount consists in its arrangement for quick and convenient dismounting. All the constituent parts are held together by improved means which permit them to be rigidly held together and yet to be readily detached for dismounting. Particularly, the gun itself is readily dismountable and may quickly be detached for use apart from the mount, if desired, and yet the means which permit such rapid and convenient dismounting of the gun from the saddle are so arranged that the gun and saddle may be as quickly and conveniently connected and clamped together as to afford substantially the same rigidity as if they were made in one piece.

A further feature of importance lies in the light and compact structural arrangement of the gun mount which permits convenient portability. It is to be noted that the relatively rotatable hollow frusto conical members, although of light construction, are nevertheless so constructed and mounted that an effective bracing of the movable member from the other member is obtained. Similarly, the saddle by straddling the outer frusto conical member can be made of light construction without sacrifice to sturdiness and still afford an effectively braced and rigid support for the gun.

The invention has been disclosed in one embodiment for the purposes of illustration, but the scope of the invention is more properly defined by the appended claims rather than by the foregoing description.

What I claim is—

1. A machine gun mount, comprising, a member movable about a substantially vertical axis, a saddle provided with means for carrying the gun and mounted near the upper end of said member to swing about a substantially horizontal axis, spaced arcuate members depending from the saddle and arranged to straddle said first-named member, spaced trackways on the latter upon which said arcuate members are arranged to ride, and means to hold said arcuate members in their various positions of angular adjustment, all constructed and arranged so that the saddle may be held to the first-named member with a three point support.

2. A machine gun mount, comprising, a member movable about a substantially vertical axis, a saddle provided with means for carrying the gun and mounted near the upper end of said member to swing about a substantially horizontal pivot, spaced arcuate members depending from the saddle and arranged to straddle said first-named member, spaced trackways on the latter upon which said arcuate members are arranged to ride, and means to hold said arcuate members in their various positions of angular adjustent, said last-named means including means to force the arcuate members tightly against their trackways, whereby the saddle is held between its pivot and the trackways against vertical displacement in either direction.

3. A machine gun mount, comprising, a member movable about a substantially vertical axis, a saddle provided with means for carrying the gun and mounted near the upper end of said member to swing about a substantially horizontal pivot, spaced arcuate members depending from the saddle and arranged to straddle said first-named member, spaced trackways on the latter upon which said arcuate members are arranged to ride, a segment gear carried by the saddle, a worm carried by the first-named member to actuate the gear, and means associated with said pivot to force the arcuate members tightly against their trackways and to depress said gear into tightly meshing engagement with its worm, whereby the saddle is held between its pivot and said trackways against verticals displacement in either direction and is held against swinging movement in either direction by the close engagement of said worm and gear.

4. A machine gun mount, comprising, a member movable about a substantially vertically axis, a saddle provided with means for carrying the gun and mounted near the upper end of said member to swing about a substantially horizontal axis, spaced arcuate members depending from the saddle and arranged to straddle said first-named member, spaced trackways on the latter upon which said arcuate members are arranged to ride, said arcuate members and trackways having a tongue and groove engagement to prevent lateral displacement of the saddle in either direction relatively to the first-named member, said arcuate members being movable about their axis, and means to hold said arcuate members in their various positions of angular adjustment, all constructed and arranged so that the saddle may be held to the first-named member with a three point support.

5. A machine gun mount, comprising, a member movable about a substantially vertical axis, a saddle provided with means for carrying the gun and mounted near the upper end of said member to swing about a substantially horizontal axis, spaced arcuate members depending from the saddle and arranged to straddle said first-named member, spaced trackways on the latter upon which said arcuate members are arranged to ride, and means to hold said arcuate members in their various positions of angular adjustment, said last-named means including means to clamp the saddle laterally against the first-named member.

6. A machine gun mount, comprising, a member movable about a substantially vertical axis, a saddle provided with means for carrying the gun and mounted near the upper end of said member to swing about a substantially horizontal axis, spaced arcuate members depending from the saddle and arranged to straddle said first-named member, spaced trackways on the latter upon which said arcuate members are arranged to ride, and means to hold said arcuate members in their various positions of angular adjustment, said last-named means including means to depress said arcuate members into close engagement with their trackways and to clamp the saddle laterally against the first-named member, whereby the saddle may be held to the latter against both horizontal and vertical displacement in either direction.

7. A machine gun mount, comprising, a member movable about a substantially vertical axis, a saddle provided with means for carrying the gun and mounted near the upper end of said member to swing about a substantially horizontal pivot, spaced arcuate members depending from the saddle and arranged to straddle said first-named member, spaced trackways on the latter upon which said arcuate members are arranged to ride, a segment gear carried by the saddle, a worm carried by the first-named member to actuate the gear, and means associated with said pivot to force the arcuate members tightly against their trackways and to depress said gear into tightly meshing engagement with its worm, whereby the saddle is held between its pivot and said trackways against vertical displacement in either direction and is held against swinging movement in either direction by the close engagement of said worm and gear, and coöperating devices on said pivot and saddle operable with said forcing means to clamp the saddle laterally against said first-named member.

8. In a machine gun mount, a saddle, training and elevating mechanism therefor, spaced lugs on the saddle between which the gun is adapted to be positioned, devices for connecting the gun to the saddle at a distance from said lugs, and means extending through the latter to connect the gun and saddle, said means being operable to draw the gun forwardly to the extent permitted by said devices and to draw the gun tightly against the saddle, whereby the gun and saddle may be rigidly held together.

9. In a machine gun mount, a saddle, training and elevating mechanism therefor, spaced lugs on the saddle between which the gun is adapted to be positioned, devices for connecting the gun to the saddle at a distance from said lugs, and means extending through the latter to connect the gun and saddle, said means being operable to draw the gun forwardly to the extent permitted by said devices and to draw the gun tightly against the saddle, and means to clamp the gun laterally between said lugs, all constructed and arranged so that the gun may be rigidly held to the saddle against movement in all directions.

10. In a machine gun mount, a saddle, training and elevating mechanism therefor, spaced lugs on the saddle between which the gun is adapted to be positioned, longitudinally adjustable devices for connecting the gun to the saddle at a distance from said lugs, and means extending through the latter to connect the gun and saddle, said means being operable to draw the gun forwardly to the extent permitted by said devices and to draw the gun tightly against the saddle, whereby the gun and saddle may be rigidly held together.

11. In a machine gun mount, a support, a member movable about said support as an axis and detachable interengaging means on said support and member to hold them from relative axial displacement, said member arranged for removal axially from its support when said means are detached, a split band encompassing said support, means to circumferentially contract the band to clamp it to the support, interengaging devices one on the band and one on said member to move the latter about its support as an axis, and means on the band engageable by said member as the latter is withdrawn axially from its support to carry the band and its attached device therewith.

12. In a machine gun mount, a support, a member movable about said support as an axis, detachable interengaging means on said support and member to hold them from relative axial displacement, said member arranged for removal axially from its support when said means are detached, a split band encompassing said support, means to circumferentially contract the band to clamp it to the support, a worm rotatably mounted on said member and held against axial movement relatively thereto, a nut on said worm and connected to said band to oscillate about an axis parallel to the axis of said member, whereby the latter may be swung about the support when said band is clamped to the support, and interengaging guiding devices one on said member and one on the nut to swing the latter on its axis and prevent binding of the worm and nut.

WILLIAM DONALD McKINNEY.